United States Patent
Frish et al.

(10) Patent No.: US 10,400,672 B2
(45) Date of Patent: Sep. 3, 2019

(54) COOLED FUEL INJECTOR SYSTEM FOR A GAS TURBINE ENGINE

(71) Applicant: United Technologies Corporation, Farmington, CT (US)

(72) Inventors: John D. Frish, Ellington, CT (US); Alexander W. Williams, Windsor Locks, CT (US); Sean D. Bradshaw, Worcester, MA (US)

(73) Assignee: United Technologies Corporation, Farmington, CT (US)

( * ) Notice: Subject to any disclaimer, the term of this patent is extended or adjusted under 35 U.S.C. 154(b) by 489 days.

(21) Appl. No.: 15/029,503

(22) PCT Filed: Oct. 31, 2014

(86) PCT No.: PCT/US2014/063419
§ 371 (c)(1),
(2) Date: Apr. 14, 2016

(87) PCT Pub. No.: WO2015/112215
PCT Pub. Date: Jul. 30, 2015

(65) Prior Publication Data
US 2016/0273453 A1    Sep. 22, 2016

Related U.S. Application Data

(60) Provisional application No. 61/899,536, filed on Nov. 4, 2013.

(51) Int. Cl.
*F23R 3/28* (2006.01)
*F02C 7/22* (2006.01)
*F02C 7/14* (2006.01)

(52) U.S. Cl.
CPC ............ *F02C 7/14* (2013.01); *F02C 7/222* (2013.01); *F23R 3/283* (2013.01); *F05D 2220/32* (2013.01); *F05D 2260/231* (2013.01); *Y02T 50/675* (2013.01)

(58) Field of Classification Search
CPC .. F02C 7/14; F02C 7/141; F02C 7/222; F02C 6/08; F23R 3/283
See application file for complete search history.

(56) References Cited

U.S. PATENT DOCUMENTS

| | | | |
|---|---|---|---|
| 3,842,597 A | 10/1974 | Ehrich | |
| 4,041,697 A | 8/1977 | Coffinberry et al. | |
| 4,120,150 A | 10/1978 | Wakeman | |
| 4,409,791 A | 10/1983 | Jourdain et al. | |
| 5,269,133 A | 12/1993 | Wallace | |
| 5,285,632 A * | 2/1994 | Halila | F23R 3/10 60/747 |

(Continued)

OTHER PUBLICATIONS

EP search report for EP14879428.2 dated Oct. 25, 2016.

*Primary Examiner* — Carlos A Rivera
(74) *Attorney, Agent, or Firm* — O'Shea Getz P.C.

(57) ABSTRACT

A cooling system for a fuel injector system of a gas turbine engine has a heat exchanger for cooling a portion of diffuser case air and then routing the cooled diffuser case air through a sleeve that surrounds a fuel injector conduit located in at least the diffuser case plenum for minimizing fuel heat-up rates in the conduit. By minimizing fuel temperatures within the injector conduit, coking accumulation is thereby eliminated or reduced.

5 Claims, 8 Drawing Sheets

(56) References Cited

U.S. PATENT DOCUMENTS

| | | | |
|---|---|---|---|
| 5,291,732 A * | 3/1994 | Halila | F23R 3/60 |
| | | | 60/752 |
| 5,363,643 A * | 11/1994 | Halila | F23R 3/002 |
| | | | 60/752 |
| 7,827,795 B2 * | 11/2010 | Hicks | F02C 3/30 |
| | | | 60/39.83 |
| 2004/0040306 A1 | 3/2004 | Prociw et al. | |
| 2004/0040310 A1 * | 3/2004 | Prociw | F23D 11/107 |
| | | | 60/776 |
| 2008/0216510 A1 | 9/2008 | Vandor et al. | |
| 2008/0304958 A1 | 12/2008 | Norris et al. | |
| 2009/0107147 A1 | 4/2009 | Piper et al. | |
| 2010/0071667 A1 | 3/2010 | Hicks et al. | |
| 2011/0016866 A1 | 1/2011 | Boardman et al. | |
| 2011/0173983 A1 | 7/2011 | Pinson et al. | |

* cited by examiner

COOLED FUEL INJECTOR SYSTEM FOR A GAS TURBINE ENGINE

This application claims priority to PCT Patent Application No. PCT/US14/063419 filed Oct. 31, 2014 which claims priority to U.S. Patent Application No. 61/899,536 filed Nov. 4, 2013, which are hereby incorporated herein by reference in their entireties.

BACKGROUND

The present disclosure relates to a gas turbine engine and, more particularly, to a fuel injector system therefor and method of operation.

Gas turbine engines, such as those that power modern commercial and military aircraft, include a compressor section to pressurize a supply of air, a combustor section to burn a hydrocarbon fuel in the presence of the pressurized air, and a turbine section to extract energy from the resultant combustion gases and generate thrust.

The combustor section generally includes a plurality of circumferentially distributed fuel injectors that axially project into a combustion chamber to supply fuel to be mixed with the pressurized air. Gas turbine engines typically include plurality individually controlled centralized staging valves with plurality fuel supply manifolds that deliver fuel to the fuel injectors. There is one fuel supply manifold for each stage, thus, each fuel injector may have plurality fuel supply connections, one for each stage.

Each fuel injector typically has an inlet fitting connected to the manifold at the base, a conduit or stem connected to the base fitting, and a nozzle tip assembly connected to the conduit or stem to spray the fuel into the combustion chamber. Appropriate valves and/or flow dividers are provided to direct and control the flow of fuel through the nozzle assembly.

The nozzle assembly often includes pilot and main nozzles. Generally, the main nozzles are for normal and high power situations, while the pilot nozzles are used for start operation. The nozzles have relatively small openings and fuel passages in the conduit that may be prone to coke formation due to high fuel temperature. Coke formation may result in narrowed fuel openings, uneven fuel burn and increased maintenance requirements. Further, coke formation may form in the fuel conduit of the fuel injector, break off in fragments and ultimately obstruct fuel injector nozzle tip openings.

Conventional fuel injector designs typically utilize heat shields around the fuel injector conduit to provide an insulated, static, air gap and reduce the heat transfer rate within the diffuser case module to the fuel. With ever increasing diffuser case air temperatures in current and future engines and where fuel is utilized to cool auxiliary systems prior to entering a fuel injector system of the engine, improved means to reduce fuel heating rates through the fuel injector conduit, and thereby minimize coking, is desirable.

SUMMARY

A cooling system for a fuel injector system of a combustor section of a gas turbine engine according to one non-limiting embodiment of the present disclosure includes a heat exchanger for cooling hot diffuser case air; a cooling fluid sleeve surrounding at least in part a fuel conduit of a fuel injector and extending to about a tip of a fuel injector of the fuel injector system; an outlet of the sleeve proximate to the tip; and an inlet of the sleeve for receiving cooled diffuser case air.

In a further embodiment of the foregoing embodiment, the cooling system has an outlet of the sleeve disposed proximate the tip.

In an alternative or additionally thereto, in the foregoing embodiment the cooling system has a distribution apparatus constructed and arranged to receive the cooled diffuser case air from the outlet and distribute the cooled diffuser case air proximate to at least one heat shield of a bulkhead assembly of the combustor section.

In an alternative or additionally thereto, in the foregoing embodiment the distribution apparatus has a plurality of tubes spaced circumferentially from one another and about the nozzle tip.

In an alternative or additionally thereto, in the foregoing embodiment the distribution apparatus has an expansion joint for connection to the sleeve.

In an alternative or additionally thereto, in the foregoing embodiment a heat exchanger conditions the cooled diffuser case air.

In an alternative or additionally thereto, in the foregoing embodiment the heat exchanger is constructed and arranged to receive bypass air of the engine for cooling of the diffuser case air.

In an alternative or additionally thereto, in the foregoing embodiment an inlet of the sleeve communicates through the engine case structure; and a distribution apparatus is constructed and arranged to receive cooled diffuser case air from the outlet and flow the cooled diffuser case air to a turbine section of the engine for cooling of the turbine section.

A gas turbine engine according to another non-limiting embodiment of the present disclosure includes a heat exchanger constructed and arranged to receive hot diffuser case air and expel cooled diffuser case air; a sleeve surrounding at least in part a conduit of a fuel injector disposed at least in part in a diffuser case module of a combustor section; and, wherein the sleeve is constructed and arranged to receive and flow the cooled diffuser case air from the heat exchanger for reducing a rate of heating of flowing fuel in the conduit.

In a further embodiment of the foregoing embodiment the heat exchanger is constructed and arranged to receive and expel bypass air from a bypass flowpath of a nacelle assembly for cooling the hot diffuser case air.

In an alternative or additionally thereto, in the foregoing embodiment the sleeve is constructed and arranged to expel the cooled diffuser case air through a bulkhead assembly.

In an alternative or additionally thereto, in the foregoing embodiment the sleeve is constructed and arranged to expel the cooled diffuser case air in a bulkhead assembly.

In an alternative or additionally thereto, in the foregoing embodiment a plurality of circumferentially spaced conduits direct cooled diffuser case air from the sleeve and are proximate to respective heat shields for cooling of the heat shields.

In an alternative or additionally thereto, in the foregoing embodiment the sleeve is constructed and arranged to expel the cooled diffuser case air in a turbine section for cooling of the turbine section.

In an alternative or additionally thereto, in the foregoing embodiment the gas turbine engine includes a manifold for distributing the cooled diffuser case air from the heat exchanger; and the fuel injector is one of a plurality of fuel injectors each having a respective sleeve that receives cooled diffuser case air from the manifold.

In an alternative or additionally thereto, in the foregoing embodiment the manifold is integral to the heat exchanger.

A method of minimizing coking within a gas turbine engine fuel injector in yet another non-limiting embodiment of the present disclosure includes the step of communicating cooled diffuser case air through a sleeve of each of a plurality of fuel injectors.

In a further embodiment of the foregoing embodiment the method includes communicating bypass air through a heat exchanger for cooling the cooled diffuser case air.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
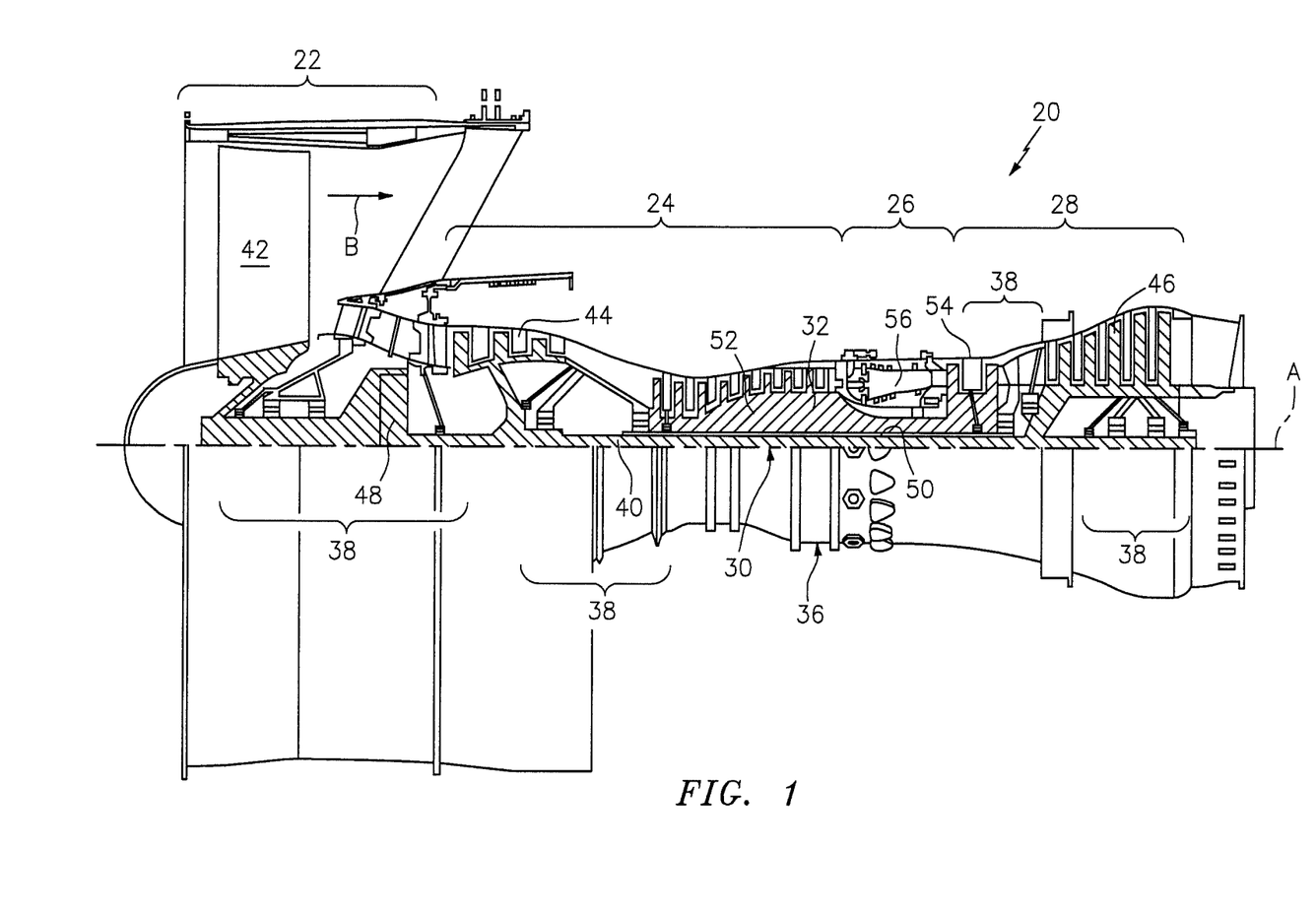
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 or engine case via several bearing structures 38. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") of the compressor section 24 and high pressure turbine 54 ("HPT") of the turbine section 28. A combustor 56 of the combustor section 26 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7$^{0.5}$) in which "T" represents the ambient temperature in degrees Rankine. The Low Corrected Fan Tip Speed according to one non-limiting embodiment of the example gas turbine engine 20 is less than about 1150 fps (351 m/s).

Figure 2:
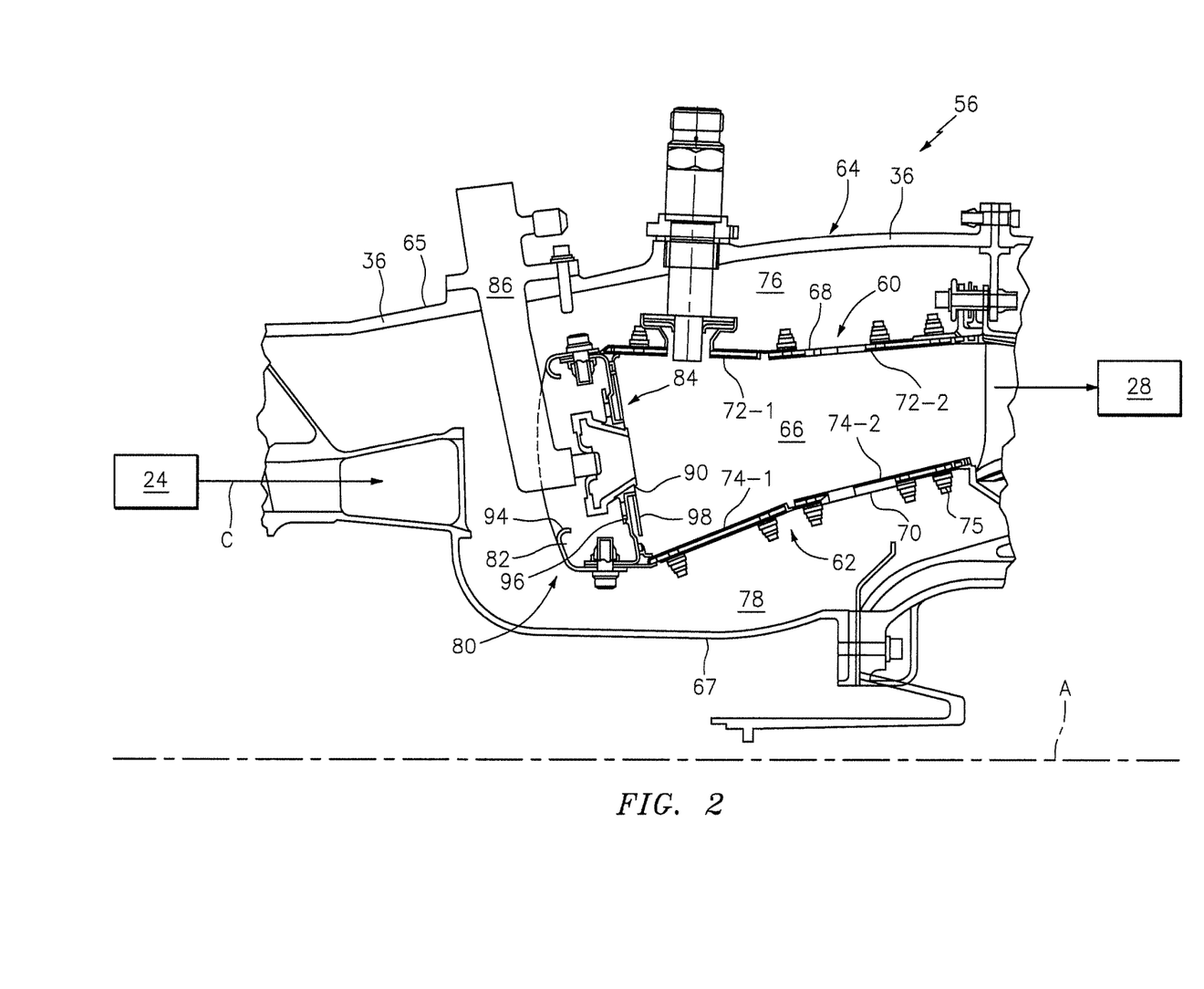
FIG. 2 is a partial longitudinal schematic cross-section of a combustor section according to one non-limiting embodiment that may be used with the gas turbine engine shown in FIG. 1.

With reference to FIG. 2, the combustor 56 may be annular and generally includes an outer wall 60, an inner wall 62 and a diffuser case module 64. The outer wall 60 and the inner wall 62 are spaced apart radially with respect to axis A and such that a combustion chamber 66 is generally defined therebetween. The combustion chamber 66 is generally annular in shape. The outer wall 60 is spaced radially inward from a diffuser outer case 65 of the diffuser case module 64, with an annular outer plenum 76 being defined therebetween. The inner wall 62 is spaced radially outward from a diffuser inner case 67 of the diffuser case module 64 to define an annular inner plenum 78. It should be understood that although a particular combustor is illustrated, other combustor types with various combustor wall and case arrangements will also benefit herefrom. For instance, the diffuser outer case 65 may be an integral part of the engine case structure 36.

Each combustor wall 60, 62 generally includes a respective support shell 68, 70 that supports one or more liners 72, 74 mounted to a hot side of the respective support shell 68, 70. The liners 72, 74 directly define the combustion chamber 66 that contains the flow of combustion products for driving the turbine section 28. The liners 72, 74 may be comprised of a plurality of Impingement Film Float (IFF) panels orientated in a generally rectilinear liner array. Each panel may be manufactured of, for example, a nickel based super alloy, ceramic or other temperature resistant material. In one disclosed non-limiting embodiment, the array includes a plurality of forward liner panels 72-1 and a plurality of aft liner panels 72-2 that line the hot side of the outer shell 68 and a plurality of forward liner panels 74-1 and a plurality of aft liner panels 74-2 that line the hot side of the inner shell 70.

The combustor 56 also includes a forward assembly 80 immediately downstream of the compressor section 24 to guide compressed airflow C therefrom. The forward assembly 80 generally includes an annular hood 82, a bulkhead assembly 84 and a plurality of swirlers 90 (one shown) spaced circumferentially about engine axis A.

The annular hood 82 extends radially between, and in this disclosed non-limiting embodiment, is secured to, the forwardmost ends of the walls 60, 62. The plurality of circumferentially distributed hood ports 94 accommodate a respective plurality of fuel injectors 86 as well as direct compressed air C into the forward end of the combustion chamber 66 through the associated swirler 90. Each fuel injector 86 may be secured to the diffuser case module 64 to project through one of the hood ports 94 and the respective swirler 90. It should be appreciated that various architectures of the forward assembly 80 will also benefit herefrom.

Each swirler 90 in this disclosed non-limiting embodiment is circumferentially aligned with its respective hood port 94 to project through the bulkhead assembly 84. The bulkhead assembly 84 includes a bulkhead support shell 96 secured to the walls 60, 62, and a plurality of circumferentially distributed bulkhead heat shields 98 secured to the bulkhead support shell 96 around each swirler 90.

The forward assembly 80 and walls 60, 62 introduce core combustion air into the forward end of the combustion chamber 66 while the remainder enters from the annular outer plenum 76 and the annular inner plenum 78. The plurality of fuel injectors 86 and respective swirlers 90 facilitate the generation of a blended fuel-air mixture that supports combustion in the combustion chamber 66.

Figure 3:
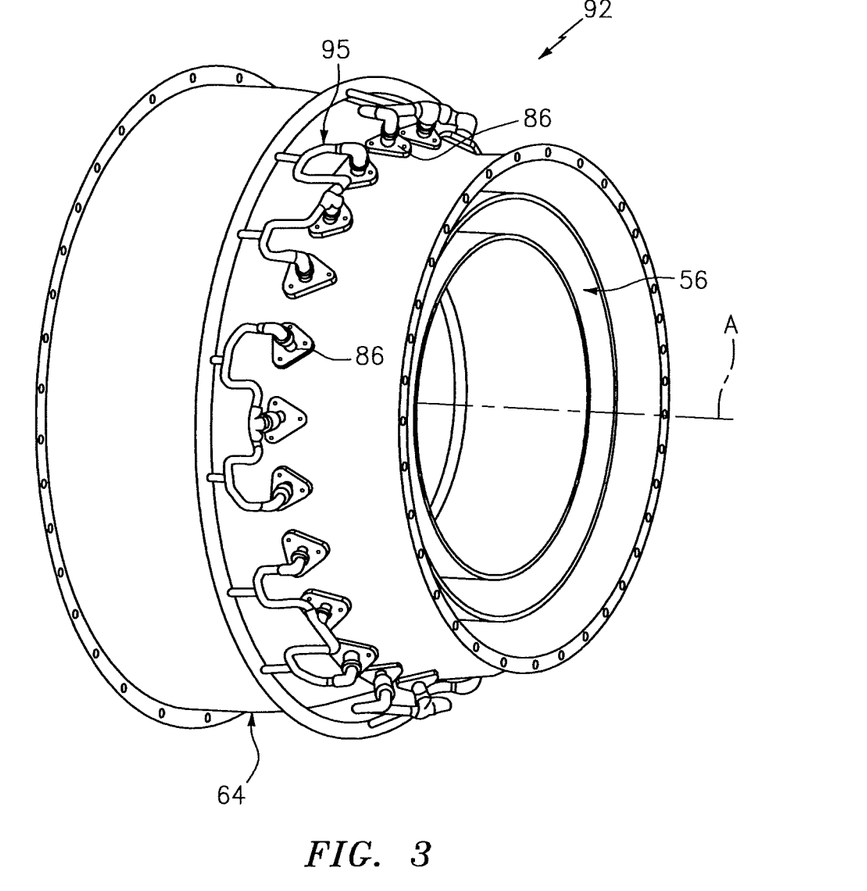
FIG. 3 is a perspective schematic isometric view of a diffuser case module that further illustrates a fuel manifold of a fuel injector system.

With reference to FIG. 3, a fuel injector system 92 generally includes one or more fuel injector supply manifolds 95 (one shown) for distributing fuel to the plurality of fuel injectors 86. The fuel injector supply manifolds 95 are generally ring shaped and arranged circumferentially around the diffuser case module 64 to communicate fuel to the plurality of fuel injectors 86 that project radially inward and into the annular combustor 56. It should be appreciated that various fuel injector systems and geometries will benefit herefrom.

Figure 4:
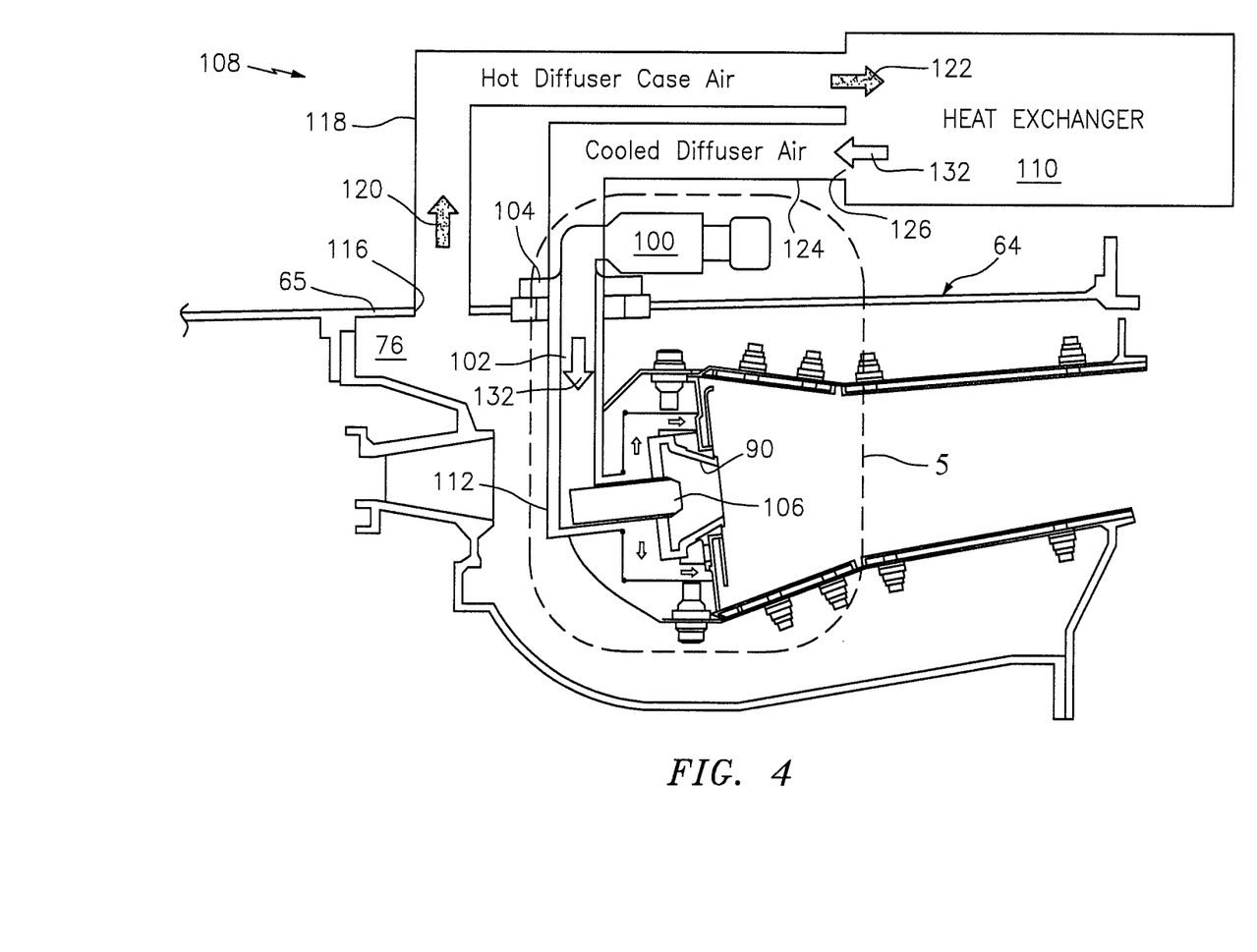
FIG. 4 is a schematic cross section of the combustor section according to one disclosed non-limiting embodiment.
Figure 5:
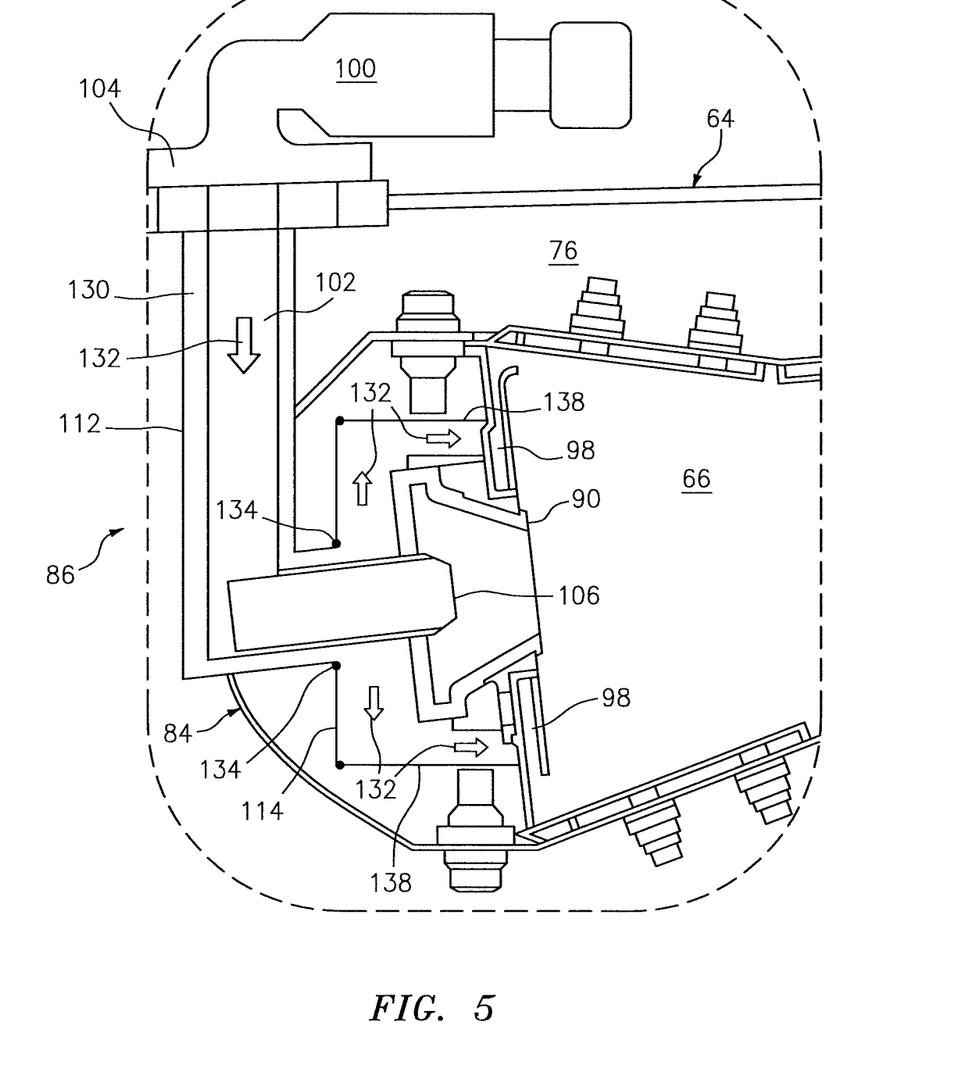
FIG. 5 is an enlarged partial schematic cross section of the combustor section of FIG. 4 taken from circle 5.
Figure 6:
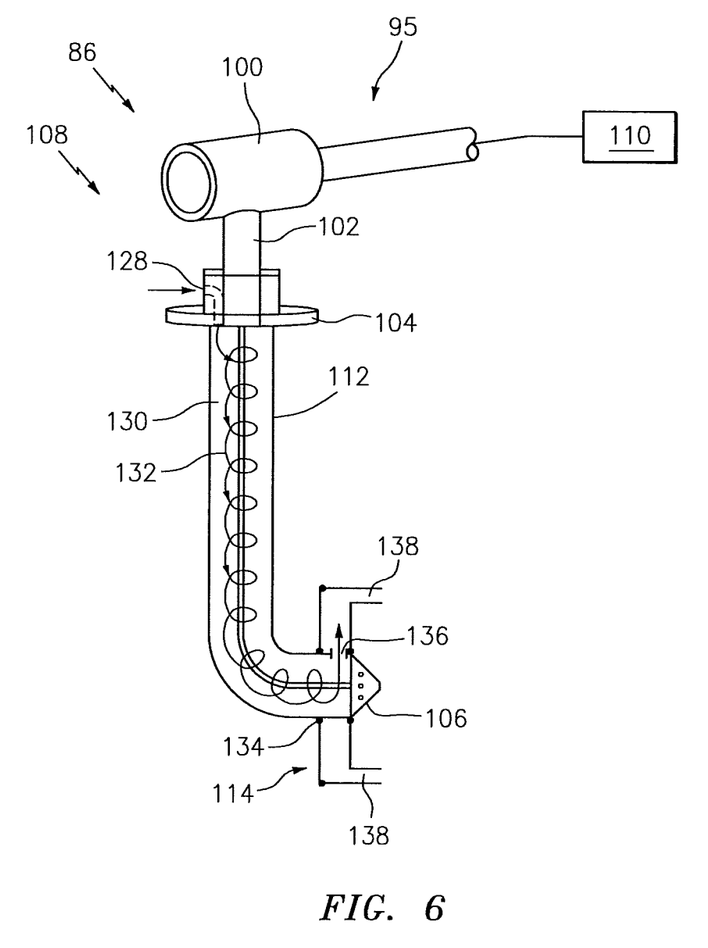
FIG. 6 is schematic view of a fuel injector of the combustor section.

With reference to FIGS. 4 to 6, each of the plurality of fuel injectors 86 generally includes a valve 100, a fuel conduit 102, a support 104, and a nozzle tip 106. The valve 100 may be located radially outward from the diffuser case module 64 and proximate to the support 104 engaged to the diffuser outer case 65 of module 64 or engine case 36. The fuel conduit 102 is supported by and extends through support 104 and spans between the fuel manifold 95 and nozzle tip 106 for flowing fuel from the manifold and through the nozzle tip 106. The valve 100 is operatively mounted to the conduit 102 upstream of the support 104 and may operate to selectively control fuel communication into one or more fuel circuits such as primary and secondary, within each of the plurality of fuel injectors 86 for direction through the nozzle tip 106. The nozzle tip 106 operates to spray the fuel into the combustor chamber 66 through the swirler 90.

A fuel injector cooling system 108 generally has a heat exchanger 110, a sleeve 112, and a flow distribution apparatus 114. The heat exchanger 110 may be located radially outward of the diffuser case module 64. A port 116 in the outer case 65 may be in direct communication between the outer plenum 76 of the diffuser case module 64 and a supply passage 118 to flow a portion of hot diffuser case air 120 to an inlet 122 of heat exchanger 110. A second or outlet passage 124 may communicate between a heat exchanger outlet 126 and an opening 128 defined by and communicating through the fuel injector support 104 (see FIG. 6). The sleeve 112 is generally concentric to and extends co-axially with the injector conduit 102, and may be engaged to and supported by the support 104. The opening 128 communicates with an annular channel 130 defined annularly between the sleeve 112 and the injector conduit 102. Cooled diffuser case air 132 is expelled from the heat exchanger 110 through the outlet 126, into the second passage 124, through the opening 128 and into the sleeve 112. Although illustrated as a relatively small orifice, the actual size of opening 128 is dictated upon the desired reduction of fuel heat-up rate in the injector conduit 102. Opening 128 in support 104 may thus be much larger while the sleeve 112 remains supported, at least in part, by support 104.

In operation, the sleeve 112 and the cooling or blanketing flow therein protect the fuel conduit 102 from the high temperatures within the diffuser case plenum that can be about or exceed 1100 F (621 C). This protection or temperature buffering by the cooling system 108 minimizes the heat-up rate of fuel flowing through the injector conduit 102 and thus minimizes coking. More specifically, the air 132 thermally interacts with the fuel conduit 102 within the sleeve 112 to manage the fuel conduit 102 wetted wall temperatures to within acceptable limits (i.e. less than 400 F) and thereby minimize—if not prevent—fuel coke deposition and resultant performance degradation of the combustor 56 along the length of the sleeve 112 to the nozzle tip 106. In one example, the acceptable wetted wall limits are about 350 F (177 C). It should be appreciated that the cooled diffuser case air 132 may be hotter than the desired fuel temperature in the conduit and may actually heat the fuel. However, because the cooled diffuser case air 132 is less than the hot diffuser case air 120 that the fuel injector conduit 102 would otherwise be exposed to, the fuel heat-up rate is reduced. It should be appreciated that various cooling fluid circuit geometries and flow directions such as, but not limited to, helical (see FIG. 6), may be utilized within the sleeve 112. The sleeve 112, and structures creating flow geometries therein, may be readily manufactured, for example, via an additive manufacturing process such as powder bed metallurgy, direct metal laser sintering, electron beam melting or other.

Figure 7:
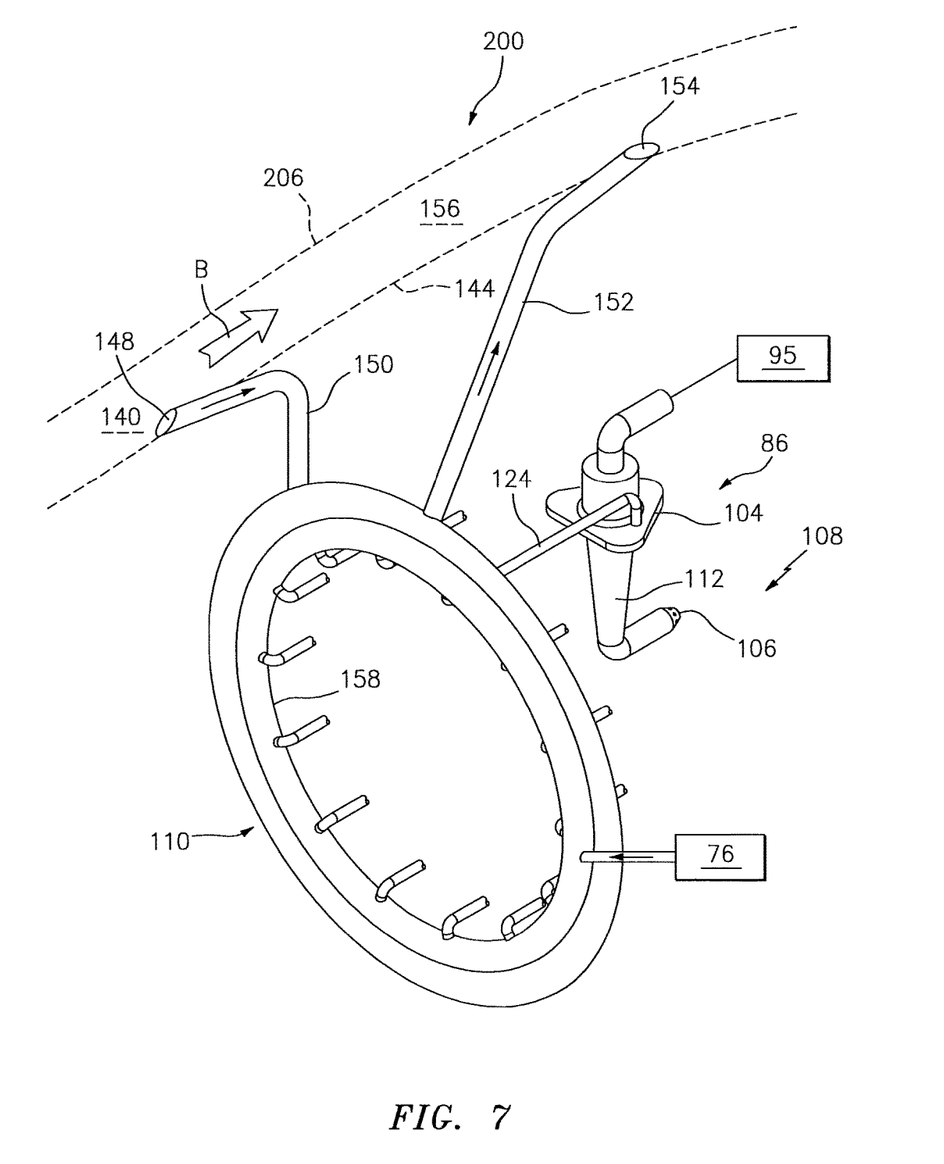
FIG. 7 is partial perspective view of a cooling system for use with the fuel injector system according to one disclosed non-limiting embodiment.

Referring to FIGS. 5 to 7, the flow distribution apparatus 114 is engaged to a distal end of the sleeve 112 and proximate to the nozzle tip 106 of the fuel injector 86. This engagement may be through an expansion joint 134 of the apparatus to account for thermal transients in the bulkhead assembly 84. From the sleeve 112, the cooled diffuser case air 132 flows through at least one outlet 136 in the sleeve and into the flow distribution apparatus 114. Apparatus 114 may expel this cooling air near or at the heat shields 98 of the bulkhead assembly 84 for a type of secondary cooling of the shields. Apparatus 114 may also be constructed and arranged to permit the typical flow of hot diffuser case air 120 from the bulkhead assembly 84 (or chamber defined therein), through the swirlers 90 and into the combustion chamber 66 for mixing and combustion with the fuel spray.

One such construction may be the use of individual tubes 138 of apparatus 114 that are circumferentially spaced and may fan radially outward from the sleeve 112 and thereby direct flow to the heat shields 98 for further cooling. In such an array each tube 138 may communicate with a respective outlet 136 in the sleeve 112. It is understood, however, that other apparatus arrangements are possible that direct cooling to the heat shields while not obstructing flow to the swirlers. For instance, an annular plenum structure may project radially outward from the sleeve 112 wherein the plenum receives cooling air 132 through a single outlet 136 and then distributes the air to the tubes 138. Furthermore, it is also understood that this secondary cooling need not be directed to the heat shields but can be routed by the apparatus to cool various components of the turbine section 28.

Figure 8:
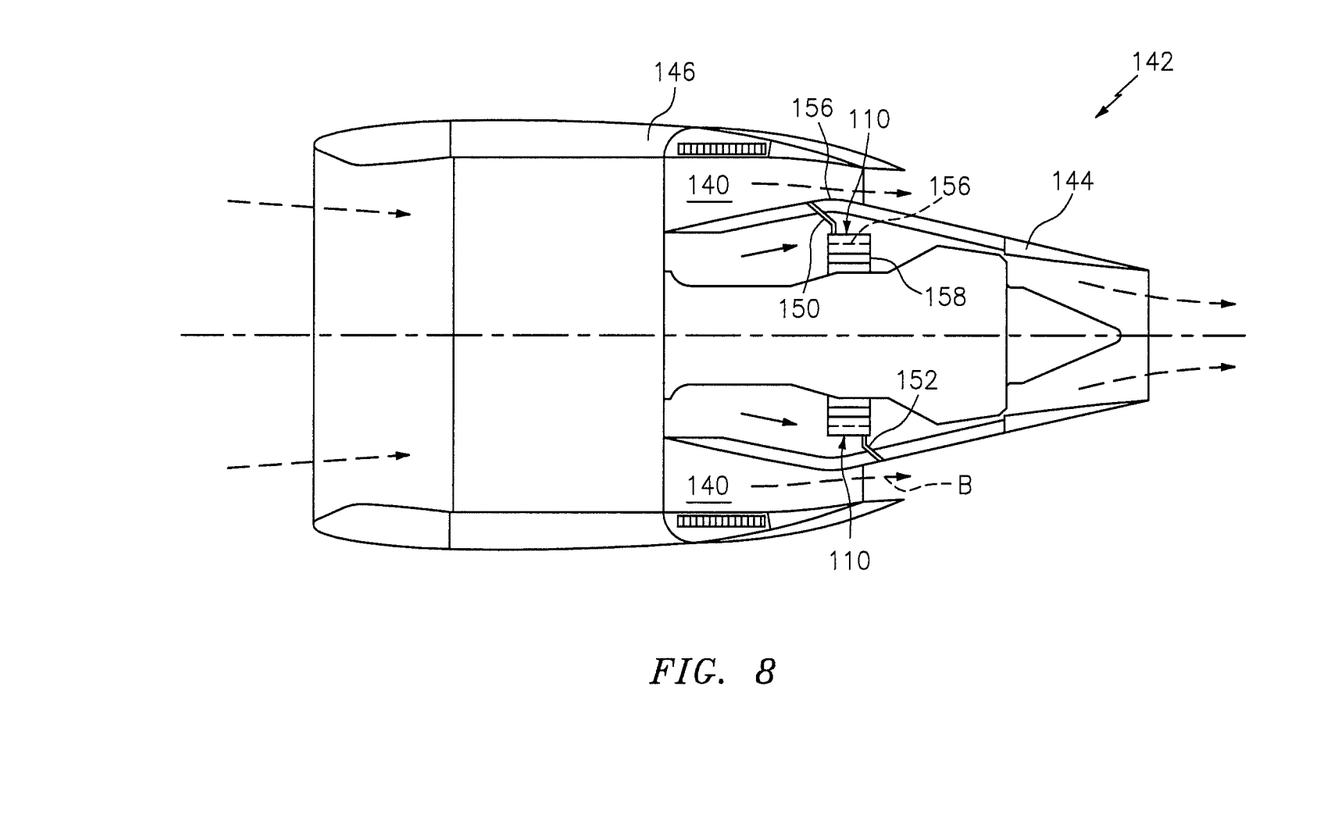
FIG. 8 is schematic view of a nacelle assembly with a cooling system according to a second disclosed non-limiting embodiment.

Referring to FIGS. 7 and 8, the heat exchanger 110 of the cooling system 108 may establish a cooling medium by utilizing bypass airflow B from within a bypass flowpath 140 of a nacelle assembly 142. The nacelle assembly 142 generally includes a core nacelle 144 at least partially surrounded by a fan nacelle 146 to define the generally annular bypass flowpath 140.

The cooling medium configuration generally includes an inlet scoop 148, an inlet passage 150, an exhaust passage 152 and an exhaust outlet 154. The inlet scoop 148 is located through the core nacelle 144 axially upstream of a throat region 156 between the core nacelle 144 and the fan nacelle 146 to direct a portion of the bypass airflow into the inlet scoop 148 (see FIG. 7). The portion of bypass airflow B from the inlet scoop 148 is thereby communicated to the heat exchanger 110 through the inlet passage 150. As the exhaust outlet 138 is located axially downstream of the throat region 156, a venturi effect generates a differential pressure relative to the inlet scoop 148 to further facilitate evacuation of the bypass air B from the heat exchanger 110 and by way of the exhaust passage 152.

The heat exchanger 110, in one disclosed non-limiting embodiment, may be a circular, internally split manifold, with a internal, heat transferring, barrier 156 that separates the bypass air B from the diffuser case air 132 being cooled. Although not shown, both the bypass air and diffuser case air may be channeled within the heat exchanger 110 to maximize heat exchanger efficiency while supporting a cooled diffuser case air manifold 158 that distributes cooled air to each of a plurality of fuel injectors 86 of the fuel injector system 92 via respective and circumferentially spaced passages 124. The manifold 158 may be an integral, annular, part of the heat exchanger 110 or can be a separate component. The heat exchanger 110 and manifold 158 may, for example, be readily manufactured with an additive manufacturing process such as powder bed metallurgy, direct metal laser sintering, electron beam melting or other. Depending upon air flow demands, it is further understood that the heat exchanger 110 and manifold 158 may be much larger than that illustrated in FIG. 7.

It should be understood that relative positional tennis such as "forward," "aft," "upper," "lower," "above," "below," and the like are with reference to the normal operational attitude and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A cooling system for a fuel injector system of a combustor section of a gas turbine engine, the cooling system comprising:
   a heat exchanger for cooling hot diffuser case air;
   a cooling fluid sleeve surrounding at least in part a fuel conduit of a fuel injector and extending to about a tip of the fuel injector of the fuel injector system;
   an outlet of the sleeve proximate to the tip;
   an inlet of the sleeve for receiving cooled diffuser case air; and
   a distribution apparatus constructed and arranged to receive the cooled diffuser case air from the outlet and direct the cooled diffuser case air onto a backside of at least one heat shield of a bulkhead assembly of the combustor section.

2. The cooling system of claim 1, wherein the distribution apparatus has a plurality of tubes spaced circumferentially from one another and about the tip.

3. The cooling system of claim 1, wherein the distribution apparatus has an expansion joint for connection to the cooling fluid sleeve.

4. The cooling system of claim 1, wherein the heat exchanger is configured for conditioning the cooled diffuser case air.

5. The cooling system of claim 4 wherein the heat exchanger is constructed and arranged to receive bypass air of the gas turbine engine for cooling of the diffuser case air.

* * * * *